Jan. 17, 1967 J. W. MOTTO, JR 3,299,297

SEMICONDUCTOR SWITCHING CIRCUITRY

Original Filed Oct. 12, 1962

WITNESSES

Leon J. Taza

James T. Young

INVENTOR

John W. Motto, Jr.

BY Ernest P. Klipfel

ATTORNEY

United States Patent Office 3,299,297

Patented Jan. 17, 1967

3,299,297

SEMICONDUCTOR SWITCHING CIRCUITRY

John W. Motto, Jr., Greensburg, Pa., assignor to Westinghouse Electric Corporation, Pittsburgh, Pa., a corporation of Pennsylvania Continuation of application Ser. No. 230,170, Oct. 12, 1962. This application Dec. 17, 1965, Ser. No. 520,030

1 Claim. (Cl. 307—88.5)

This is a continuation of application Serial No. 230,170, filed October 12, 1962, now abandoned, and assigned to the same assignee.

The present invention relates to switching circuitry, and more particularly to semiconductor switching circuitry using controlled rectifiers having a gate turn-off characteristic.

Four-layer PNPN or NPNP semiconductor switching devices, commonly called controlled rectifiers, have many advantages over existing switching devices. Among these advantages are: high switching efficiency, high surge current ratings, fast switching times, high power gain, pulse turn-on and completely static operation. However, a primary limitation of such a semiconductor switch exists in its ability to turn off current once it has been rendered conductive. Essentially, to turn such a controlled rectifier off, the anode current must be reduced substantially to zero, which may be analogized to the characteristics of a thyratron tube. Recently developed four-layer semiconductor switches, herein called turn-off controlled rectifiers, have the important additional feature of being capable of turning off current by applying a negative pulse voltage to the gate electrode, besides maintaining the other inherent advantages of controlled rectifiers. Since the turn-off characteristic permits the switching off of large amounts of current, the turn-off controlled rectifier may provide a very useful function in various switching circuits.

Reference is made to copending application Serial No. 143,354, filed October 6, 1961, now Patent No. 3,210,563 by T. C. T. New and assigned to the same assignee as the present invention, showing a semiconductor switching device having a gate turn-off characteristic which could be used in the present invention.

It is, therefore, an object of the present invention to provide new and improved switching circuitry utilizing turn-off controlled rectifiers.

It is a further object of the present invention to provide new and improved switching apparatus utilizing turn-off controlled rectifiers having the capability of switching large quantities of current on and off in a time controlled manner.

Broadly, the present invention provides switching circuitry in which a controlled rectifier having a gate turn-off characteristic is rendered conductive and non-conductive in a time controlled manner to provide a switching function across a load.

Figure 1:
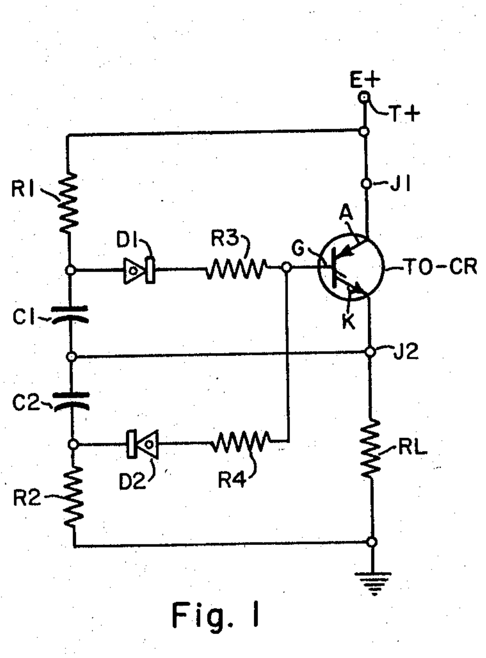
Figure 2:
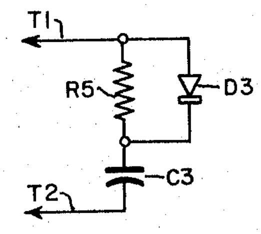

These and other objects will become more apparent when considered in view of the following specification and drawing in which:

FIG. 1 is a schematic diagram embodying the teachings of the present invention; and FIG. 2 is a schematic diagram of a circuit which may be added to the circuit of FIG. 1.

Referring to FIG. 1, an astable, free-running multivibrator circuit or D.C. chopper circuit is shown utilizing a turn-off controlled rectifier TO–CR, which may be a device such as disclosed in the copending application supra. With the turn-off controlled rectifier TO–CR in its non-conductive, turned-off state, by connecting a source of direct voltage E+, not shown, to the terminal T+, the capacitor C1 will charge to a predetermined voltage from the source E+ through the resistor R1, and the load resistance RL to ground. A discharge circuit including the breakdown diode D1 and the resistor R3 is connected across the capacitor C1 to the gate electrode G of the turn-off controlled rectifier TO–CR. The breakdown diode D1 has such a characteristic that when a predetermined voltage is applied thereacross the diode will break down into a hyperconductive region and will sustain current flow at a low voltage level, as is well known in the art. Other devices such as unijunction transistors, neon tubes or manual push buttons may be used to replace the function of the breakdown diode. Thus, when the voltage across the capacitor C1 reaches a predetermined value, the diode D1 will break down, thus providing a positive voltage pulse to the gate electrode G of the rectifier TO–CR through the diode D1 and the resistor R3. The application of positive potential to the gate electrode G will cause the turn-off controlled rectifier TO–CR to become conductive and, therefore, provide a low resistance current path from the potential source E+ through the anode electrode A and the cathode electrode K of the rectifier and then through the load resistor RL to ground. The "on" time constant, that is the time it will be required to switch the rectifier TO–CR from its non-conducting to conducting state, will be determined by the time constant (R1+RL) C1. The turn-on time may readily be controlled by adjusting the values of these components. With the rectifier TO–CR in its conducting state, the capacitor C2 will begin to charge from the cathode electrode K of the rectifier TO–CR through the capacitor C2 and the resistor R2 to ground. During the time period determined by the value of the resistor R2 and the capacitor C2, current will continue to be passed through the load resistance RL. A discharge circuit including the breakdown diode D2 and the resistor R4 is connected across the capacitor C2 to the gate electrode G of the turn-off controlled rectifier TO–CR. When the potential across the capacitor C2 reaches a predetermined value, after a time constant determined by C2R2, the breakdown diode D2 will go into its high current, low voltage state, such that a discharge path will be provided from the capacitor C2 through the gate electrode G, the resistor R4 and the diode D2. This will appear as though a negative voltage is applied to the gate electrode G, which will cause the turn-off controlled rectifier to switch to its off, non-conducting state. With the turn-off controlled rectifier TO–CR having supplied a negative voltage from the discharge of the capacitor C2, current will be blocked from passing to the load RL from the source E+; thus, the circuit will be placed in its original state and the cycle will start over with the capacitor C1 again beginning to charge through the resistor R1 and the load resistance RL to ground. The circuit thus functions as an astable, free-running multivibrator with the turn-on time being controlled by the time constant established by the resistor R1, the load resistor RL and the capacitor C1. The turn-off time is in turn controlled by the values of the resistor R2 and the capacitor C2. The values of the direct source potential E+ and the breakdown values of the diodes D1 and D2 are selected so that a sufficient potential will be applied to the gate electrode to turn in the turn-off controlled rectifier on or off as the case may be.

To increase the current turn-off capabilities of the turn-off controlled rectifier TO–CR, the shunt circuit of FIG. 2 may be utilized so that additional anode current may be switched off than with just the circuit shown in FIG. 1. So if the terminals T1 and T2 of FIG. 2 are connected to the junctions J1 and J2, respectively, of FIG. 1 the capacitor C3 effectively shunts part of the anode current during turn-off, which permits the gate to effectively turn off greater anode currents. The resistor R5 connected in series with the capacitor C3 is utilized to limit the discharge current from the capacitor C3 when it is desired to turn the turn-off controlled rectifier on again during the next cycle. The diode D3 is connected in parallel across the resistor R5 with its cathode toward the capacitor C3 so that the diode effectively shunts the resistor R5 during turn off of the controlled rectifier TO–CR. Using the shunt circuit of FIG. 2 has the effect of increasing the turn-on and turn-off time constants because of the capacitive and resistive elements added to the circuit; however, because of the increased turn-off capabilities in many applications, the incorporation of this circuit into that of FIG. 1 may be advantageous.

It should also be noted that the circuit of FIG. 1 will operate in monostable and bistable modes as well as the astable, free-running mode. The monostable mode of operation may be obtained by either disconnecting the resistor R1, the capacitor C1, the diode D1 and the resistor R3 and then applying a positive pulse voltage to the gate electrode G when it is desired to turn the turn-off controlled rectifier TO–CR on. The rectifier TO–CR will then remain conducting until the turn off time determined by the time constant of the elements R2 and C2 has been reached in the manner explained above. Alternatively, the capacitor C2, the resistor R2, the diode D2 and the resistor R4 may be disconnected from the circuit, and the turn-off controlled rectifier may be turned off by applying a negative potential pulse to the gate electrode G when it is desired to switch the rectifier to its non-conductive state. Thus, the controlled rectifier TO–CR will remain conductive and allow a current to flow through the load RL until a negative pulse is applied to the gate electrode G and then the controlled rectifier will remain off until the time constant of the turn-on circuitry has been completed. Also, bistable operation may be obtained by alternately pulsing with positive and negative pulses the gate electrode G of the turn-off controlled rectifier TO–CR without the use of the timing circuitry or with the timing circuitry to change the pulse repetition rate of the astable multivibrator or D.C. chopper circuit.

Although the present invention has been described with a certain degree of particularity, it should be understood that the present disclosure has been made by way of example, and numerous changes to details of circuitry in the combination and arrangement of elements may be resorted to without departing from the scope and the spirit of the present invention.

I claim as my invention:

A switching circuit operative with a source of potential and a load including:

a semiconductor controlled rectifier having a gate turn off characteristic including a gate electrode, an anode electrode and a cathode electrode, with said anode and cathode electrodes being operatively connected between said source of potential and said load;

a first timing circuit operative to provide a turn-on signal to said gate electrode of said rectifier after a predetermined time and render said rectifier conductive to provide a conductive path to said load, said first timing circuit including, a first capacitor operatively connected between said anode and cathode electrodes and being charged during the time period when said rectifier is nonconductive, and a first discharge circuit including first voltage responsive means operatively connected across said first capacitor to said gate electrode to permit said first capacitor to discharge after a predetermined time therethrough when a predetermined voltage is reached across said first capacitor to apply a turn-on signal to said gate electrode and render said rectifier conductive between said anode and cathode electrodes;

a second timing circuit operative to provide a turn-off signal to said gate electrode of said rectifier after a predetermined time and render said rectifier non-conductive, said second timing circuit including, a second capacitor operatively connected across the load, said second capacitor beginning to charge in response to said rectifier becoming conductive, and a second discharge circuit including second voltage responsive means operatively connected across said second capacitor to said gate electrode to permit said second capacitor after a predetermined time from the time said rectifier is rendered conductive to discharge therethrough when a predetermined voltage is reached across said second capacitor to apply a turn-off signal to said gate electrode and render said rectifier nonconductive between said anode and cathode electrodes;

said first capacitor beginning to be charged in response to the non-conduction of said rectifier so that a positive turn-on signal is applied to said gate electrode of said rectifier to render it conductive after a predetermined time from the time said rectifier is rendered non-conductive; and a shunt circuit including a third capacitor operatively connected between said anode and cathode electrodes of said rectifier to increase the amount of current that can be turned off by said rectifier.

References Cited by the Examiner

UNITED STATES PATENTS

| | | | |
|---|---|---|---|
| 3,197,716 | 7/1965 | Wright et al. | 307—88.5 |
| 3,206,696 | 9/1965 | Wright | 307—88.5 |

ARTHUR GAUSS, *Primary Examiner.*

B. P. DAVIS, *Assistant Examiner.*